Feb. 14, 1961 — E. WILDHABER — 2,971,788
TOOTHED MEMBER
Filed Nov. 26, 1956 — 3 Sheets-Sheet 1 known art known art

INVENTOR:
Ernest Wildhaber

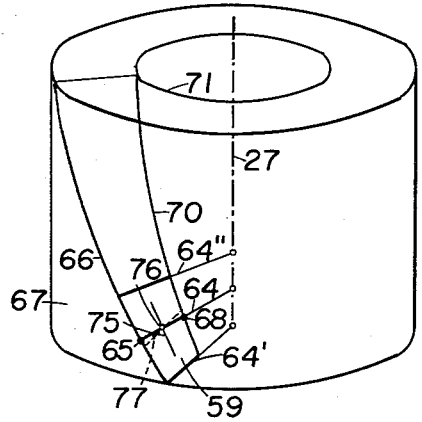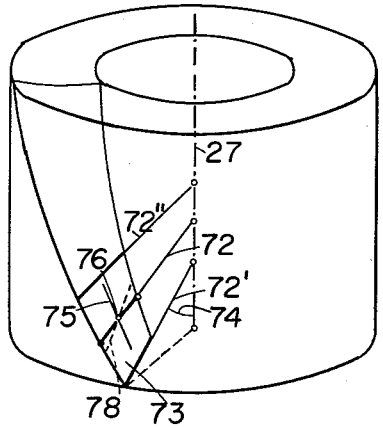
FIG. 12    FIG. 13
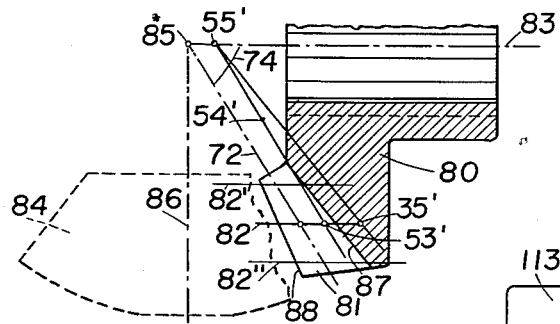
FIG. 14
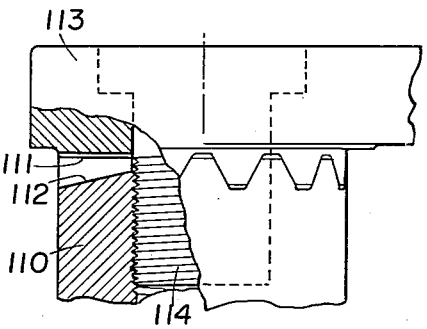
FIG. 16
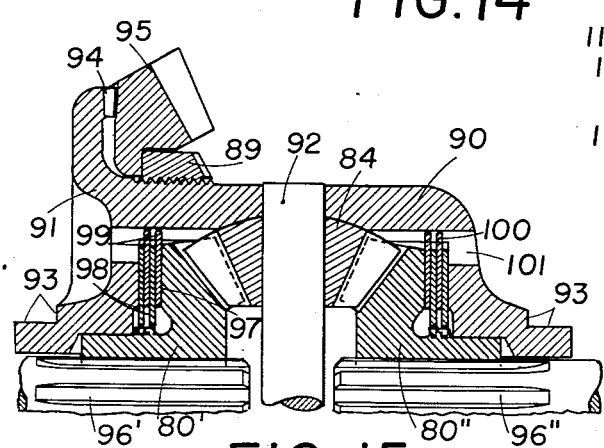
FIG. 15
INVENTOR:
Ernst Wildhaber United States Patent Office 2,971,788
Patented Feb. 14, 1961

2,971,788
TOOTHED MEMBER

Ernest Wildhaber, Brighton, N.Y.
(124 Summit Drive, Rochester 20, N.Y.)

Filed Nov. 26, 1956, Ser. No. 624,343

8 Claims. (Cl. 287—103)

The present invention relates to toothed members having straight teeth arranged about an axis and projecting from a tapered root surface in a chiefly axial direction. In accordance with the present invention, opposite side surfaces of these teeth have approximately straight profiles in cylindrical sections coaxial with said member; and the said profiles are inclined to the direction of said axis increasingly with increasing distance from said axis.

More specifically the said profiles of each tooth side are portions of coaxial helices of the same lead, at least approximately. And opposite tooth surfaces are helical surfaces of opposite hand.

Such members are for use in toothed face couplings, and also on the larger members of bevel-gear pairs.

One object of the present invention is to provide a toothed face coupling which permits a practical design with longer teeth than are commonly in use, and with more strength, and where the tooth strength at the tooth ends is better balanced.

A further object is to devise a toothed face coupling having straight teeth with opposite helical tooth sides, where the teeth have a tapering depth and the tooth bottoms have a constant width from end to end. A related object is to overcome the obstacles that oppose the cutting of helical tooth surfaces of tapering depth.

A still other object is to devise an improved toothed face coupling that can be finished with the lapping method described in my application Serial No. 508,432, filed May 16, 1955, now Patent No. 2,830,834, granted April 15, 1958.

A still other aim is to provide a pair of straight-tooth bevel gears, in which the gear member can move axially with respect to the pinion member without disturbing the mesh, that is without throwing the tooth bearing to he boundaries of the teeth.

A related object is to provide a partially locking bevel-gear differential that contains friction surfaces axially movable slightly with respect to one another, and in which the gear members are thereby slightly displaced relatively to their pinions, where the gear teeth are so shaped that the mesh is not disturbed by such axial displacement.

Other objects will appear in the course of the specification and in the recital of the appended claims.

These objects may be attained singly or in any combination.

In the drawings:

Figures 12 and 13 are diagrammatic perspective views of two basic forms of helical surfaces, for use chiefly on coupling members and chiefly on gears respectively.

Fig. 14 is a fragmentary axial section of a straight-tooth bevel gear having helical tooth surfaces, in accordance with the present invention, showing also the mating pinion in dotted lines.

Fig. 15 is an an axial section showing one half of a bevel-gear differential containing friction surfaces for braking the relative motion of the two axle shafts, in which the gear member contains helical tooth sides and is insensitive to axial displacement, in accordance with the present invention.

Fig. 16 is a fragmentary view, partly an axial section, of a fixed type face coupling in a built-up crank shaft, illustrating an application of the face coupling and toothed member of my invention.

Figure 1:
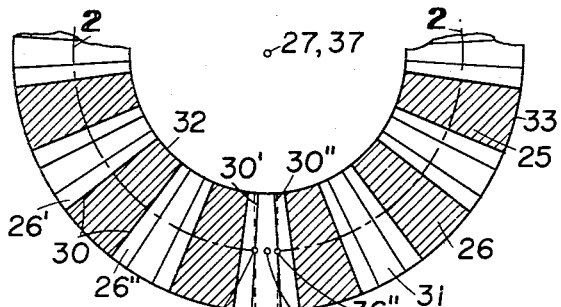
Fig. 1 is a cross-section, taken along lines 1—1 of Fig. 5, of a known face coupling member having straight teeth and helical tooth sides, illustrating, together with Figures 2, 5 and 6, the relationships to be observed in transforming this coupling to one with tapering tooth depth and tooth bottoms of constant width.

Figures 1 to 6 show a toothed member 25 having teeth 26 arranged about its axis 27. Opposite sides 26', 26" of the teeth are helical surfaces of opposite hand. Each tooth side can be described or traced by a radial profile 30 that is turned about axis 27 and moved axially as it turns, in proportion to the turning motion. The teeth 26 of known member 25 have a constant depth from end to end, so that the tooth bottoms 31 lie in a plane perpendicular to the axis 27 of member 25. The tooth bottoms are bounded by radial lines 30', 30", which represent positions of the radial tracing line 30, and which intersect on axis 27 when extended.

Figures 5, 6:
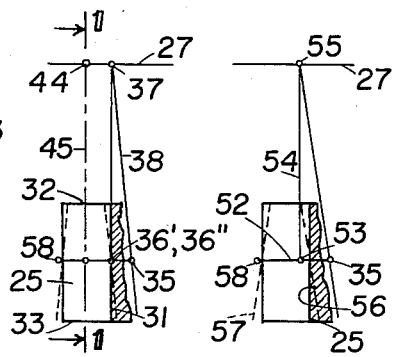
Fig. 5 is a fragmentary axial section of the member shown in Fig. 1, with construction lines for determining the direction of the tooth bottoms when the tooth bottoms have a constant width from end to end.
Fig. 6 is a section similar to Fig. 5, illustrating a modified procedure for the case where the tooth sides are relieved adjacent the tooth bottom.
Figure 2:
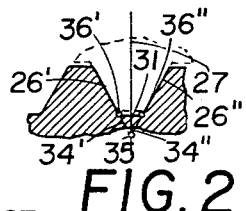
Fig. 2 is a fragmentary section taken along the cylindrical surface 2—2 of Fig. 1, looking away from the axis.
Figures 3, 4:
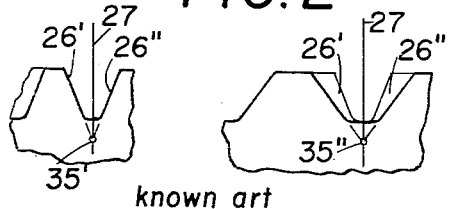
Figures 3 and 4 are fragmentary end views of the teeth of the face-coupling member shown in Fig. 1, taken from the inner end and from the outer end respectively, for comparison with Figures 9 and 10.

Tooth bottoms of constant width can be attained by raising the tooth bottoms 31 at the inner end 32 of the teeth, and deepening them at the outer end 33. How much the direction of the tooth bottoms should be altered will now be described with Figures 1, 2 and 5. Points 36', 36" are considered that lie at the juncture of the mean side profiles of the teeth with the tooth bottom 31. The tangent plane of tooth side 26' at point 36' contains the profile tangent 34' and radial line 30'. Similarly the tangent plane of the tooth side 26" at point 36" contains the profile tangent 34" and radial line 30". The radial lines 30', 30" intersect at point 37 of the original root plane, on axis 27 (Fig. 5). The profile tangents 34', 34" (Fig. 2), intersect at a point 35 below the tooth bottom.

The opposite tangent planes intersect therefore in a straight line 38 (Fig. 5) that connects the points 35 and 37.

The sought tooth bottom should be parallel to line 38 and contain line 36'—36" of tooth bottom 31. Such a plane intersects the two tooth tangent planes along two parallel straight lines. Such an inclined tooth bottom has the same width at both ends 32, 33.

Figures 7, 8:
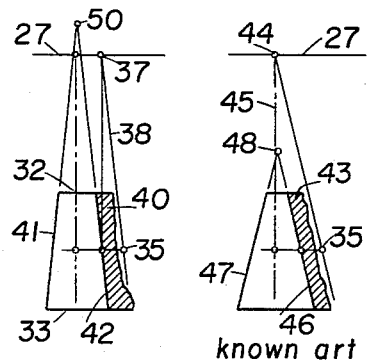
Fig. 7 is a fragmentary axial section of a toothed face-coupling member constructed according to the present invention, in accordance with the construction described with Figures 1, 2 and 5.
Fig. 8 is a fragmentary axial section, shown for comparison, of a known face coupling member having also tooth bottoms of constant width, but having plane tooth sides.

The toothed member 40 of Fig. 7 is so designed. Its face surface 41 is also tapered. It is equally and oppositely tapered as the root surface 42 that contains the tooth bottoms, to conform to the root surface of a mating coupling member identical with member 40.

Fig. 8 shows for comparison a coupling member 43 having the same mean side tangents (34', 34") as member 40, but having plane tooth sides instead of helical ones. These plane sides intersect the axis 27 at a point 44 of the pitch plane 45. The straight profiles of said plane tooth sides intersect at point 35. The connecting line 35—44 is thus the intersection line of the opposite plane tooth sides of the considered tooth space. A tooth bottom 46 of constant width has to run parallel to this line. The face line 47 is similarly inclined in opposite direction, so that it follows the tooth bottom of the mating coupling member.

The extended tooth bottom 46 and face line 47 intersect at a point 48, whereas on the helical member 40 of Fig. 7 the extended root line 42 and face line 41 intersect at a point 50 beyond axis 27.

The proportions shown in Fig. 8 permit to cut or grind both sides of a tooth space simultaneously with a single tool, and are known as duplex proportions. But the tooth taper is excessive on long teeth. More practical proportions (Fig. 7) are however attained with tooth bottoms of constant width when the tooth sides are helical surfaces.

Figures 9, 10:
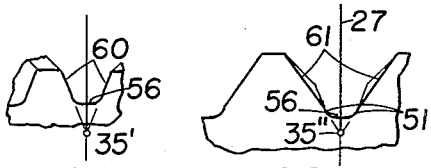
Figures 9 and 10 are fragmentary side views, taken along the tooth bottoms, of a face coupling member constructed according to the present invention in accordance with Figures 1, 2 and 6; the view being taken from the inner end and from the outer end of the teeth respectively.

The helical tooth surfaces may be relieved adjacent the tooth bottom, so that the profile of a helical surface joins the tooth bottom with a relieving fillet (51, Fig. 10). The fillet surface intersects the helical side surface in a line that may run parallel to the tooth bottom. In this case the tooth taper is preferably so determined that the width of the tooth space is constant at the level of said line.

Fig. 6 refers to this case. The helical profile 52 reaches from the tooth top down to a point 53. The geometrical construction is then made with this point, rather than with point 36' (Fig. 5) of the tooth bottom. Line 54 is drawn through point 53 at right angles to axis 27. It intersects axis 27 at a point 55. The tooth bottom 56 should be parallel to the connecting line 35—55 of the points 35 and 55. The tooth top 7 may be equally and oppositely inclined as the tooth bottom. It passes at a distance equal to the bottom clearance from point 58, which is a point of the root surface of an identical counterpart coupling member.

End views of the teeth are shown in Figures 9 and 10, taken from the inner end and from the outer end of the teeth respectively. Opposite inner profiles 60 of a tooth space intersect at a point 35' when extended. Opposite outer profiles 61 of the tooth space intersect at a point 35". The points 35', 35", as well as point 35 of the mid- section, lie on the same radial line and have the same axial position.

The tooth depth is smaller at the inner profiles 60 than at the outer profiles 61. It increases with increasing pitch. This provides a strength better balanced at the tooth ends than the constant tooth depth shown for comparison in Figures 3 and 4, where the pitch is the same as in Figures 9 and 10 respectively.

The improved structure attains therefore the following advantages: (1) A better balance of strength and stronger teeth. (2) A width of the tooth bottom, that equals the width at the tooth middle and is larger than the width at the inner end of known design (Fig. 1). This permits to use wider and stronger tools in production. (3) Tooth spaces (Fig. 10) that can be roughed out more closely than those of Fig. 4 with a single tool. The coupling lends itself better to roughing. (4) It is less limited in the length of the teeth than can be used.

To attain these advantages an obstacle had to be overcome. An alteration of the direction of the cut, as required in cutting tapered teeth, alters the lengthwise curvature of the helical tooth surfaces, as can be demonstrated mathematically. The shown tooth taper results in tooth surfaces that are convex lengthwise. This is indicated with exaggeration by the dotted lines 62 in Fig. 11. Such tooth surfaces do not contact along their whole length, but only in the middle portion. A slight ease-off at the tooth ends is permissible and even desirable, but it should not be as excessive as it usually occurs without correction. The invention provides a correction that is fully described in connection with the production of the toothed members.

Figure 11:
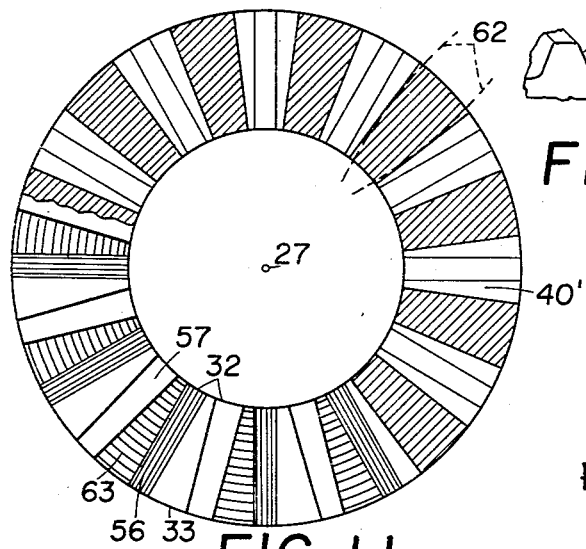
Fig. 11 is partly an axial view, and partly a cross-section of the face coupling member also shown in Figures 9 and 10, the section being taken along the pitch plane.

Fig. 11 is partly an axial end view, and partly a cross section of a coupling member 40' constructed according to the present invention and having opposite helical side surfaces on its teeth. The section is taken along the pitch plane or mean plane, like the section in Fig. 1. Except for the tooth bottoms 56 the sectional view is the same as that of Fig. 1. The tooth bottoms 56 have an approximately constant width, and the same width at the inner end 32 and at the outer end 33.

In the axial view one side surface 63 of each tooth is shown shaded with circular arcuate lines concentric with axis 27. On these teeth the tooth bottoms 56 are also shaded, with parallel lines extending in the direction of the respective tooth bottom. The tooth tops 57 are indicated by heavier boundary lines.

In this axial view the general appearance of the toothed member is similar to that of a conventional member of the type indicated in Fig. 8, except that the tooth tops 57 have a tendency to be wider at their inner end 32 than at their outer end 33. This occurs with helical tooth sides when the tooth clearance is constant from end to end of the teeth, and the intersection point 53 (Fig. 6) between the helical profile and the relieving fillet has a larger distance from the tooth bottom than said clearance. While the side surfaces of the teeth appear narrow at the inner end 32 of the teeth, they have there a relatively small inclination to the axial direction, so that they have ample depth.

A helical surface 59, such as may be used on coupling members, is diagrammatically indicated in the perspective view of Fig. 12. It is known as a right helicoid, and can be described or traced by a straight radial line 64 which moves along axis 27 and simultaneously turns about this axis, in direct proportion to the translatory motion. Three positions 64', 64, 64" are shown. Each point of line 64 traces a helix of the same lead. Thus point 65 traces a helix 66 on the cylindrical outside surface 67. Point 68 traces a helix 70 on the cylindrical inside surface 71. The entire surface 59, and each portion of it, contains a system of straight lines (such as 64', 64, 64") that are equally positioned with respect to axis 27 and include a constant angle therewith. These straight lines here intersect axis 27 and include a right angle therewith.

A helical surface such as may be used especially on gear members is shown in Fig. 13. Here the straight-line element 72 is inclined to the axis 27 of the helical surface 73 at an acute angle, which remains fixed. This fixed angle 74 may be the pitch angle of the gear. Three positions 72', 72, 72" of element 72 are indicated in Fig. 13.

75 denotes the helix tangent at mean point 76, in both Figures 12 and 13. The helical surfaces 59, 73 are practically straight in a normal section laid through the helix tangent (75). That is, the intersection line has a point of inflection at 76. The intersection line is exactly straight in the direction of the describing or tracing element 64 or 72.

Let us consider a tooth whose root is below the tooth top in Figures 12 and 13, so that the shown helical surfaces 59, 73 are at the right of the considered tooth. Then a line 77 (Fig. 12), that extends through point 76 parallel to the tooth bottom of constant width, is inclined to the tracing line 64 so that it points upwardly from line 64 towards the inside. It can be demonstrated mathematically that a normal section taken in this direction through the helical surface 59 has a concave sectional profile, as have all sections taken in this quadrant. Likewise a normal section taken along line 78 through surface 73 has a concave sectional profile.

If in the production a straight line is substituted for the concave curve of the section 77, the resulting helical surface will be more convex longitudinally than it should be. It will be convex in the direction of line 64 instead of being straight. And if the mating coupling member is made in the same way, both members of the coupling will be convex in this direction, which coincides when the members are in full engagement. The tooth surfaces then contact only in the middle portion, and are separated increasingly towards the tooth ends.

The required correction will be further discussed with the production hereafter.

The bevel gear 80 shown in Fig. 14 contains teeth 81 whose opposite side surfaces are helical surfaces of opposite hand; surfaces of the general character indicated in Fig. 13. In cylindrical sections 82', 82, 82" coaxial with the gear axis 83 such tooth surfaces have profiles that are parts of coaxial helices. The helices of each side of the teeth have the same constant lead and inclinations to the direction of axis 83 increasing with increasing distance from said axis. The sectional profiles tangent to said helices are approximately straight.

A mating pinion 84 is shown in dotted lines. Like other bevel gear pairs, this pair 80, 84 runs together as if a pair of conical pitch surfaces moving with the gear and pinion respectively roll on each other without sliding. The apex 85 of the pitch surfaces lies at the intersection of the axis 83 with axis 86 of the pinion. Each gear-tooth surface may contain a straight-line element 72 of the conical pitch surface, inclined from the gear axis 83 at the pitch angle 74.

The pinion 84 is formed conjugate to gear 80.

The construction for determining the taper of the teeth, to attain tooth bottoms of constant width, is analogous to the one described for face-coupling members. 53' corresponds to point 53 of Fig. 6 and represents the point where the helical tooth profile meets the profile of the relieving fillet. Line 54' is drawn through point 53' in the direction of the straight-line element (72) contained in the helical tooth surfaces. It intersects axis 83 at a point 55'. 35' is the intersection point of the tangents to opposite tooth profiles of the cylindrical section 82. These tangents contact the opposite helices of the considered tooth space at points projected into 53'. The connecting line 35'—55' determines the direction of the tooth bottom 87, which is parallel to said connecting line. The direction of the tooth top 88 is obtained with the same construction applied to the (imaginary) counterpart member that is coaxial with gear 80.

In operation the gear pair transmits load on one side of the teeth at a time. If a moderate helical displacement along the contacting helical tooth sides of the gear is added to the gear motion, the helical tooth surfaces are merely displaced in themselves, and the gear mesh remains undisturbed, except for a slight change in the depth of engagement. The same positions are attained when the gear is displaced along its axis and turned about its axis to remain in engagement with the pinion. In other words: An axial displacement of this gear, having helical tooth sides, does not disturb its mesh, while on conventional bevel gears the tooth bearing shifts very soon to the edges and ends of the teeth. This destroys the proper mesh and may cause breakage. The insensitivity of the mesh to axial gear displacement is the merit of this helical form of tooth.

An application is shown in Fig. 15. The bevel-gear differential 90 is of the partial-locking type. It contains a one-piece planet carrier 91 carrying bevel pinions 84 rotatably mounted thereon by means of a pin 92 secured to said carrier. The carrier 91 contains seats 93 for antifriction bearings. Rigidly secured to the planet carrier by a toothed face coupling 94 is a ring gear 95. The coupling 94 is maintained in rigid engagement by a nut 89 that threads onto said carrier.

The pinions 84 mesh with a pair of side gears 80', 80" having straight teeth with helical side surfaces, as described with respect to gear 80. The side gears 80', 80" are splined to two axle shafts 96', 96" respectively and are rotatably mounted in the planet carrier 91. Instead of bearing directly against the carrier, the plane rear surfaces 97 of the side gears 80', 80" transmit their axial thrust to the opposite sides of carrier 91 through interengaging friction disks 98, 99. These are secured to the hubs of the side gears and to the carrier respectively to turn therewith. The disks 99 have projections 100 that engage the sides of a pair of diametrically opposite square holes 101 provided in the planet carrier 91. Only one of these holes is visible in Fig. 15. Both sets of disks are free to move axially.

In operation the friction disks 98, 99 are under axial load increasing with increasing torque transmitted through the differential. They provide a frictional resistance to the relative turning motion of the two side gears and their axle shafts. When one wheel slips, this enables the wheel which has a good grip on the road to exert more pull than the slipping one.

The side gears move back very slightly under load, away from the pinions. Also they move further back with increasing wear of the friction disks. This axial displacement is without consequence when the bevel gears 80', 80" contain helical tooth surfaces as described.

Other kinds of locking differentials of bevel-gear type are known, having different friction surfaces. These also oppose relative turning motion of the two axle shafts (96', 96") increasingly with increasing torque transmitted through the differential. Here also the side gears move somewhat axially under load and after wear, more than in conventional differentials with less friction. Here also gears with helical tooth surfaces cure the difficulties.

One application of the coupling of the present invention is illustrated in Fig. 16, which shows part of a built-up crank shaft. This figure also illustrates the freedom of design: the two coupling members of a pair do not necessarily have to be identical. Fig. 16 shows a coupling member 110 with a plane face surface 111 and a tapered root surface 112. The tooth bottoms lie on a conical surface. The mating member 113 has a plane root surface, and its face surface follows the tapered root surface 112.

The two coupling members 110, 113 are kept in rigid engagement by a bolt 114 threading into member 110.

There are many more applications, as is readily understood.

The production

Figure 17:
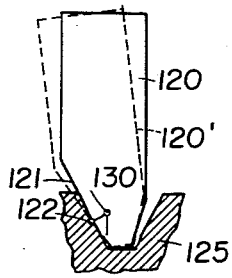
Fig. 17 is a cross section similar to Fig. 2, taken along lines 17—17 of Fig. 18, showing also a side-cutting tool in engagement with one side of the teeth.
Figure 18:
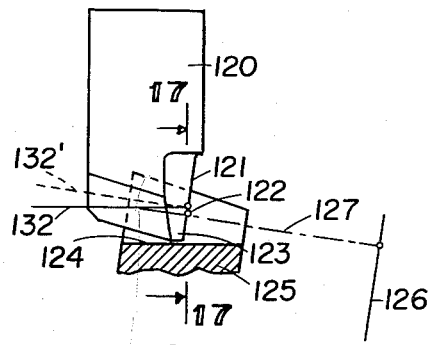
Fig. 18 is an axial section of a face-coupling member and a side view of the tool, corresponding to Fig. 17.

Fig. 17 and Fig. 18 show one way of cutting my face coupling with reciprocatory tools. Tool 120 contains a straight cutting edge 121 coinciding with the helix tangent at mean point 122. An inclined cutting face 123 provides side rake, to achieve a keen cutting edge 121. The tool 120 is moved in the direction of the tooth bottom 124 of the coupling member 125. 126 is the axis of member 125, and 127 its pitch plane or mean plane.

As the tool moves in the direction of the tooth bottom 124, it is also tilted, to conform to the varying inclination of the helices. It may be tilted about an axis passing through the mean point 122 (Fig. 17). But this affects the depth of cut somewhat, or it may be tilted about an axis passing through point 130 directly above the corner of the tool. This corner then moves laterally in the tooth bottom, as the tool tilts.

Tool 120 may be tilted about an axis 132 that extends in the direction of the tool reciprocation, instead of being tilted about an axis 132' that lies in a plane perpendicular to the coupling axis 126. Dotted lines 120' (Fig. 17) show the tool in a tilted position.

As the tool path is inclined to the pitch plane as shown, a straight path of the tool produces convex longitudinal profiles in the pitch plane. To obtain more nearly straight longitudinal profiles a further motion is added to either the tool or preferably to the coupling member. As the tool moves through its cutting path the coupling member or work piece 125 is moved along its axis 126 to reduce the depth of the cut at both ends. The cutting stroke starts in a slightly withdrawn position of the work piece 125, with the work piece advancing axially at a decreasing rate. In the middle position of the cutting stroke the said axial motion reaches zero and then reverses. From then on to the end of the stroke the work piece is withdrawn at an increasing rate as compared with the stroke travel.

The axial movement required can be either computed or determined by trial.

What has been described is a cutting stroke at full-depth position, when a tooth side is being finish-cut. Cuts are taken previously at a gradually increasing cutting depth until this position is reached. Also the tooth spaces may have been roughed out before that. The work piece is indexed to present other tooth spaces to the tool. A plurality of tools may be used simultaneously, if desired, as described in my application Serial No. 573,034, filed March 21, 1956.

Figure 19:
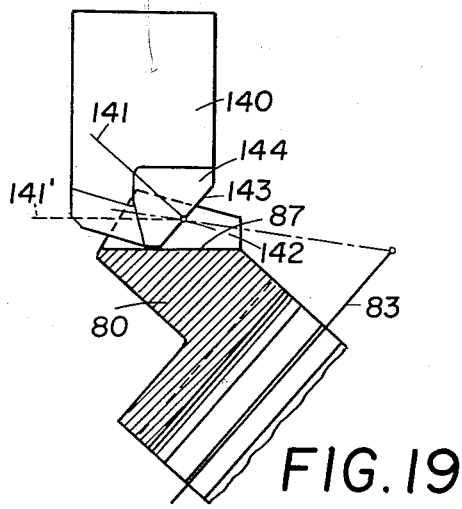
Fig. 19 is a fragmentary axial section of a straight-tooth bevel gear, shown in engagement with a reciprocatory tool cutting a helical tooth side.

The approximately helical tooth sides of bevel gear 80 (Fig. 19) may be cut in a similar way with a reciprocatory tool 140 that moves in the direction of the tooth bottom 87 and is simultaneously tilted about an axis 141 which passes through the mean point 142 of the tooth surface being cut. Axis 141 lies in a plane perpendicular to axis 83 of the bevel gear. If desired a tilt axis 141' that extends in the direction of the tool stroke may be used in place of axis 141. The side-cutting edge 143 coincides with the helix tangent at mean point 142. A cutting face 144 of ample side rake is used to provide a keen cutting edge. Prior to this side-cutting operation a roughing cut may be provided that also applies the described fillets.

It is also possible to use a cutting edge that is perpendicular to the direction of the tool stroke.

Helical tooth surfaces of excellent approximation may be produced in the described ways. As on couplings, a correcting motion along the axis of the work piece may also be used on gears. Here however this is less important when the pinion is obtained by generation. Such generation comprises describing or tracing a tooth side of the gear with a cutting tool, while simultaneously effecting a relative feed motion between the tool and pinion blank, as if the gear and pinion would mesh and roll on each other. The proper conjugate tooth surface is then generated with enveloping cuts on the pinion blank. The pinion may also be produced by rapid form-cutting methods of the general character described in my above named application Serial No. 573,034.

Another way of finish-cutting a toothed coupling member or gear member is by embodying as a cutting edge a line extending lengthwise in the known helical tooth surface, and cutting and tracing the tooth surface by effecting a relative helical motion between this cutting edge and a work piece, about the axis of the work piece. In this case it is imperative that the work piece is roughed out previously and that a relieving fillet is provided at the tooth bottom. The cutting edge is preferably a line that follows the tooth bottom in its position of closest approach thereto. The cutting stroke is preferably towards the tooth bottom.

Figure 20:
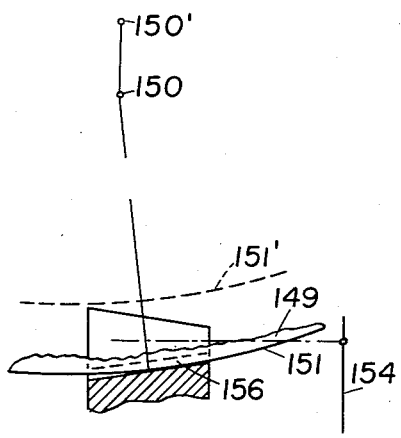
Fig. 20 is an axial section similar to Fig. 18, but showing a milling cutter or rotary tool in place of the reciprocatory tool.

A process of cutting the helical side surfaces of a tooth space with a rotary tool will now be described with Figures 20 and 21. It is applicable to coupling members and bevel-gear members alike. The tool may be embodied as a milling cutter 149 having an axis 150, shown close to the cutter periphery 151 for convenience. No individual cutting edges are shown, only a fragment of the cutting surface described by the cutting edges as they rotate about the cutter axis.

The cut starts with the cutter axis in a position 150' and the cutter periphery in the dotted position 151' relatively to the work piece. As the cutter rotates, helical feeding motion is effected between the cutter and the work piece, about and along the axis 154 of the work piece. A helical tooth side is completed when the full-depth position is reached, where the cutter axis is at 150 and the cutter periphery is at 151 relatively to the work piece. The opposite side of the tooth space may be cut on the way out, as the cutter and work piece separate.

With reciprocatory tools a motion has to be added to the straight-line reciprocation to cut shallow at both ends of the stroke. An external rotary tool of disk type provides the required shallow depth at the stroke ends very naturally, by simple rotation about an axis. No correction or axial motion of the work piece is here needed. The cutter diameter is selected to give the required effect. Here also the tooth spaces are preferably roughed out before this finishing cut is applied, and a relieving fillet 156 is provided at the tooth bottom.

The cutting surface, in which the cutting edges lie, is a surface of revolution that contacts the given helical surface along a line, and can be so determined. During the feed motion this line of contact gradually sweeps the entire tooth surface down to the intersection with the fillet surface.

Figure 21:
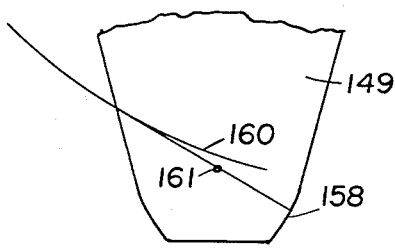
Fig. 21 is an enlarged peripheral view of the cutter of Fig. 20, showing its contour, which is also the profile of an axial section of its cutting surface.

Fig. 21 shows the side profile 158 of the cutter 149. It is a curve of varying curvature, whose curvature radii increase towards the outside. It is similar to an involute of a base circle such as circle 160. The larger the diameter of the cutter, the smaller are the curvature radii of this profile (158). At a suitable cutter diameter the mean curvature center may be at 161, midway between opposite profiles. If desired, a circle centered at 161 may then be substituted for the exact cutter profile.

This is only a selection of the many manufacturing methods possible.

The invention has been described with several embodiments, all having a toothed member with approximately straight profiles in cylindrical sections coaxial with said member, in the development of said sections to a plane, the profile inclinations changing lengthwise of the teeth and increasing with increasing distance from the axis of said member.

The invention is capable of further embodiments, and this application is intended to cover any variations, uses, or adaptations of the invention following, in general, the principle of the invention and including such departures

I claim:

1. A pair of interengaging toothed members, one of which has straight teeth tapering in depth along their lengths and arranged about an axis and projecting from a tapered root surface in a chiefly axial direction, the profiles of said teeth in cylindrical sections coaxial with said axis being approximately straight in development and being inclined to the direction of said axis increasingly with increasing distance from said axis, on both sides of said teeth.

2. A pair of toothed members according to claim 1, wherein opposite side surfaces of said teeth of said one member are helical surfaces of opposite hand at least approximately, said helical surfaces being coaxial with said axis.

3. A pair of toothed members according to claim 2, wherein the bottoms of the tooth spaces of said one member have the same width at opposite ends.

4. A pair of toothed members according to claim 3 wherein said one member has a root surface and a face surface whose mean profile tangents in an axial plane intersect at a point beyond the axis of said member.

5. A pair of toothed members according to claim 2, wherein all regions of the helical tooth sides of said one member contain straight lines equally positioned with respect to the axis of said member and including a constant angle with the direction of said axis.

6. A pair of toothed members according to claim 5, wherein said straight lines include an acute angle with the direction of said axis, said angle being larger than one half of a right angle.

7. A pair of interengaging toothed members according to claim 2 wherein the other of said members is a toothed member that is a counterpart of said one member and that is coaxial therewith and is adapted to contact with the sides of the teeth of said one member.

8. A pair of toothed members according to claim 2, wherein said members have unequal tooth numbers and are adapted to roll together in engagement, each of said members having longitudinally straight teeth, said one member having the larger tooth number, and the other member is conjugate to said one member and is adapted to transmit uniform motion to said one member when it rolls in engagement with said one member, said two members meshing with their axes angularly disposed to one another.

References Cited in the file of this patent
UNITED STATES PATENTS

| Number | Name | Date |
|---|---|---|
| 594,219 | Tredwell | Nov. 23, 1897 |
| 1,134,733 | Geb | Apr. 6, 1915 |
| 1,455,706 | Bower et al. | May 15, 1923 |
| 1,469,290 | Williams | Oct. 2, 1923 |
| 1,818,261 | Koch et al. | Aug. 11, 1931 |
| 2,429,284 | Wildhaber | Oct. 21, 1947 |
| 2,609,710 | Osborn | Sept. 9, 1952 |
| 2,651,216 | Alden | Sept. 8, 1953 |
| 2,830,834 | Wildhaber | Apr. 15, 1958 |